United States Patent
Siddappa et al.

(10) Patent No.: US 12,548,140 B2
(45) Date of Patent: Feb. 10, 2026

(54) DETERMINING PROCESS DEVIATIONS THROUGH VIDEO ANALYSIS

(71) Applicant: Kyndryl, Inc., New York, NY (US)

(72) Inventors: Sheela Siddappa, Bengaluru (IN); Khanij Kumar S G, Bangalore (IN)

(73) Assignee: Kyndryl, Inc., New York, NY (US)

( * ) Notice: Subject to any disclaimer, the term of this patent is extended or adjusted under 35 U.S.C. 154(b) by 413 days.

(21) Appl. No.: 17/993,651

(22) Filed: Nov. 23, 2022

(65) Prior Publication Data

US 2024/0169513 A1 May 23, 2024

(51) Int. Cl.
| | |
|---|---|
| G06T 7/00 | (2017.01) |
| G06V 10/764 | (2022.01) |
| G06V 10/82 | (2022.01) |
| G06V 20/40 | (2022.01) |
| G06V 20/52 | (2022.01) |

(52) U.S. Cl.
CPC .............. G06T 7/001 (2013.01); G06V 10/82 (2022.01); G06V 20/41 (2022.01); G06V 20/46 (2022.01); G06T 2207/10016 (2013.01); G06T 2207/20081 (2013.01); G06T 2207/20084 (2013.01); G06T 2207/30108 (2013.01)

(58) Field of Classification Search
CPC .......... G06T 7/001; G06T 2207/10016; G06T 2207/20081; G06T 2207/20084; G06T 2207/30108; G06V 10/82; G06V 20/41; G06V 20/46; G06V 2201/06; G06V 10/764; G06V 20/52
USPC ....................................................... 382/141
See application file for complete search history.

(56) References Cited

U.S. PATENT DOCUMENTS

| | | | |
|---|---|---|---|
| 7,110,454 B1 * | 9/2006 | Chakraborty .......... | G06V 20/40 348/700 |
| 9,251,598 B2 * | 2/2016 | Wells ..................... | G06V 20/52 |
| 10,110,858 B2 | 10/2018 | Loce et al. | |
| 11,138,710 B2 * | 10/2021 | Kotula .................... | G06F 18/22 |

(Continued)

FOREIGN PATENT DOCUMENTS

| | | | | |
|---|---|---|---|---|
| CN | 109374042 A | | 2/2019 | |
| CN | 113313025 A | * | 8/2021 | ............. G06V 40/23 |

(Continued)

OTHER PUBLICATIONS

Siddappa, S., U.S. Appl. No. 18/112,574, filed Feb. 22, 2023.

(Continued)

*Primary Examiner* — Henok Shiferaw
*Assistant Examiner* — Dion J Satcher
(74) *Attorney, Agent, or Firm* — CANTOR COLBURN LLP; Erik Swanson

(57) ABSTRACT

A computer-implemented method, according to one embodiment, includes identifying, in a reference video of a production process of a product, a discrete and non-overlapping set of first tasks. The first tasks define at least a first sub-process. The method further includes analyzing a live video of the production process to identify frames of the live video that include second tasks that define a second sub-process, and analyzing the frames of the live video for determining whether a match exists between the first tasks and the second tasks. In response to a determination that the match does not exist, an alert that a deviation is present in the production process depicted in the live video is output.

18 Claims, 8 Drawing Sheets

(56) References Cited

U.S. PATENT DOCUMENTS

| | | | |
|---|---|---|---|
| 11,216,656 B1* | 1/2022 | Zia | G06N 3/04 |
| 11,789,999 B2* | 10/2023 | Xu | H04N 21/23418 |
| | | | 382/190 |
| 2017/0300753 A1* | 10/2017 | Billi | G06V 20/52 |
| 2019/0220525 A1* | 7/2019 | Song | G06F 18/217 |
| 2020/0005449 A1 | 1/2020 | Ambikapathi et al. | |
| 2020/0057432 A1 | 2/2020 | Yu et al. | |
| 2020/0209836 A1* | 7/2020 | Bauer | G06Q 50/04 |
| 2021/0142456 A1 | 5/2021 | Varga et al. | |
| 2022/0101016 A1* | 3/2022 | Sachdeva | G06T 7/0004 |

FOREIGN PATENT DOCUMENTS

| | | | | |
|---|---|---|---|---|
| CN | 109195011 B | * | 1/2022 | G06V 20/47 |
| CN | 114693771 A | | 7/2022 | |
| EP | 3518145 A1 | * | 7/2019 | G06V 10/764 |
| WO | 2022053719 A1 | | 3/2022 | |

OTHER PUBLICATIONS

Mell et al., "The NIST Definition of Cloud Computing", NIST, Special Publication 800-145, Sep. 2011, 7 pages.

Music Box Company, Ltd, "How to wrap a gift", https://www.youtube.com/watch?v=8P2-55l7rHg, Jan. 30, 2019, 1 page.

Atcom Services, Inc., "Tech Tip: How to Cut a Bolt with a Plier and Screwdriver", Jul. 24, 2013, 1 page.

Kyndryl, List of Kyndryl Patents or Patent Applications Treated as Related, dated, May 26, 2023, 2 pages.

McCann et al., "In-situ sensing, process monitoring and machine control in Laser Powder Bed Fusion: A review," Additive Manufacturing, vol. 45, 2021, pp. 1-19.

* cited by examiner

DETERMINING PROCESS DEVIATIONS THROUGH VIDEO ANALYSIS

BACKGROUND

The present invention relates to manufacturing, and more specifically, this invention relates to determining process deviations based on whether tasks that define a sub-process in a live video match tasks that define a sub-process in a reference video.

Manufacturing is a scaled process of making a product using machinery and/or humans. In manufacturing, various processes are inspected in order to ensure that steps and procedures are and/or have been correctly followed. Typically, machine learning-based solutions are adapted for ensuring that a production is being performed correctly. In some instances, this includes observing process parameters, e.g., using a set value via condition monitoring approach. This is true for the majority of automated or machine-based production steps. For example, where manual tasks are involved, e.g.: folding, packing, wrapping, etc., condition monitoring has a relatively minimal role to play. It is important to ensure production itself is correct, so as to minimize a number of defects that occur and are potentially identified during a testing or inspection phase.

SUMMARY

A computer-implemented method, according to one embodiment, includes identifying, in a reference video of a production process of a product, a discrete and non-overlapping set of first tasks. The first tasks define at least a first sub-process. The method further includes analyzing a live video of the production process to identify frames of the live video that include second tasks that define a second sub-process, and analyzing the frames of the live video for determining whether a match exists between the first tasks and the second tasks. In response to a determination that the match does not exist, an alert that a deviation is present in the production process depicted in the live video is output.

A computer program product, according to another embodiment, includes a computer readable storage medium having program instructions embodied therewith. The program instructions are executable by a computer to cause the computer to perform the foregoing method.

A system, according to another embodiment, includes a hardware processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining process deviations based on whether tasks that define a sub-process in a live video match tasks that define a sub-process in a reference video.

In one general embodiment, a computer-implemented method includes identifying, in a reference video of a production process of a product, a discrete and non-overlapping set of first tasks. The first tasks define at least a first sub-process. The method further includes analyzing a live video of the production process to identify frames of the live video that include second tasks that define a second sub-process, and analyzing the frames of the live video for determining whether a match exists between the first tasks and the second tasks. In response to a determination that the match does not exist, an alert that a deviation is present in the production process depicted in the live video is output.

In another general embodiment, a computer program product includes a computer readable storage medium having program instructions embodied therewith. The program instructions are executable by a computer to cause the computer to perform the foregoing method.

In another general embodiment, a system includes a hardware processor, and logic integrated with the processor, executable by the processor, or integrated with and executable by the processor. The logic is configured to perform the foregoing method.

Figure 1:
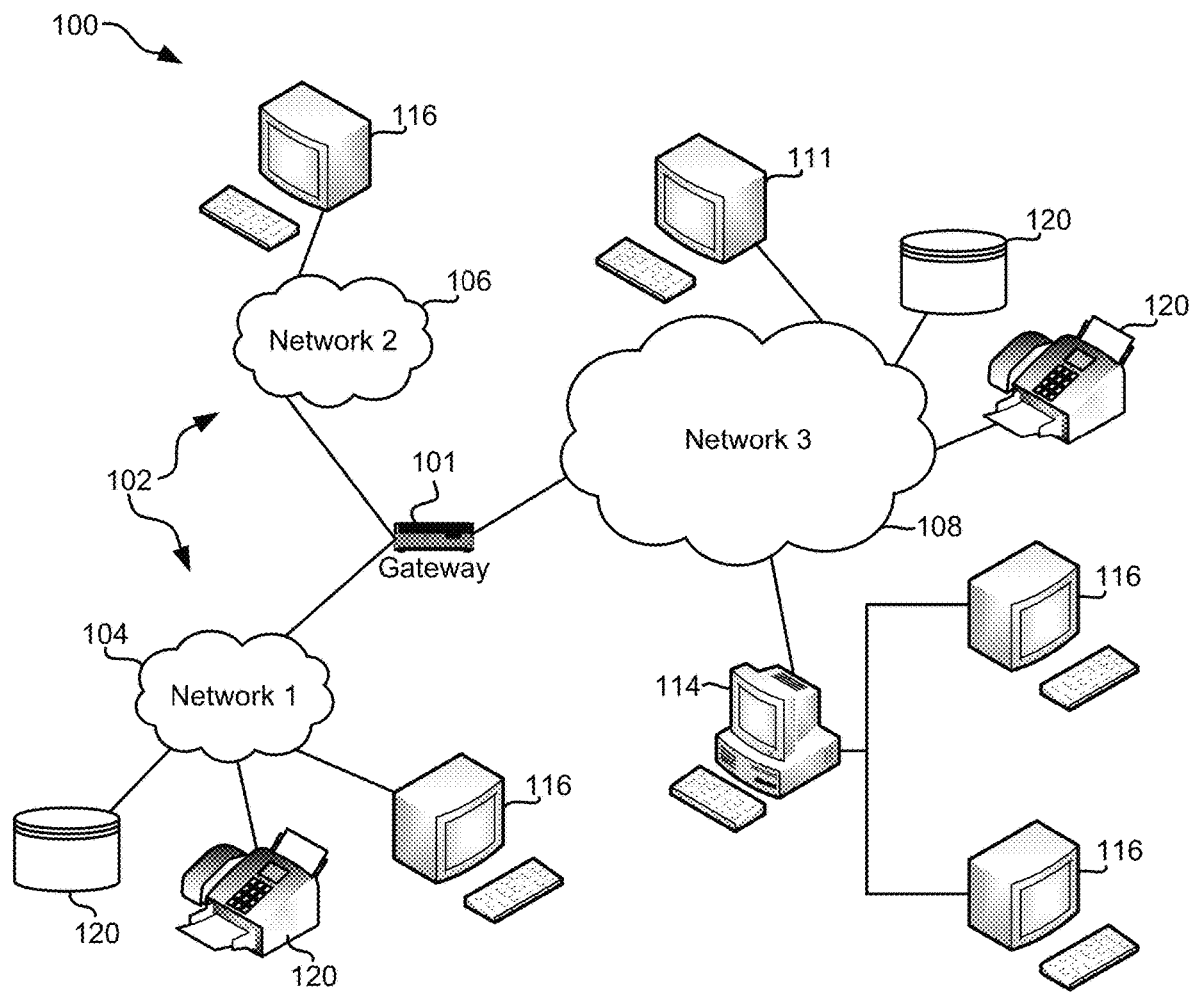
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
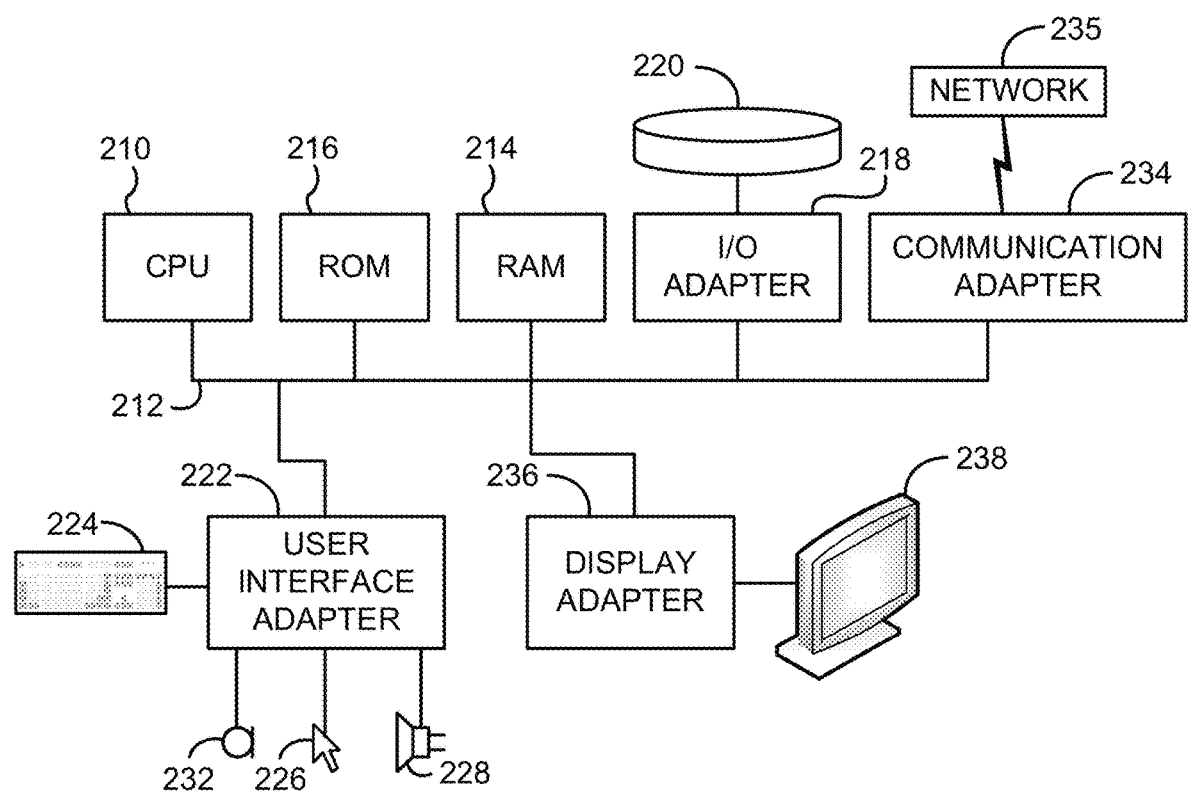
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As mentioned elsewhere above, manufacturing is a scaled process of making a product using machinery and/or humans. In manufacturing, various processes are inspected in order to ensure that steps and procedures are and/or have been correctly followed. Typically, machine learning-based solutions are adapted for ensuring that a production is being performed correctly. In some instances, this includes observing process parameters, e.g., using a set value via condition monitoring approach. This is true for the majority of automated or machine-based production steps. For example, where manual tasks are involved, e.g.: folding, packing, wrapping, etc., condition monitoring has a relatively minimal role to play. It is important to ensure production itself is correct, so as to minimize a number of defects that occur and are potentially identified during a testing or inspection phase.

A first conventional technique to process inspection includes quality inspection of a produced product. A second conventional technique to process inspection includes manual inspection of a production process. In this second conventional technique, generally, only a relatively small sample is inspected. This leads to some defective products not being inspected and thereby passing into packaging and/or to consumers. Upon a retailer and/or consumer receiving a defective product, issues arise. For example, a return or exchange process is typically initiated with the manufacturer and/or distributor. Furthermore, as a result of at least some defective products not being inspected and/or detected, additional defective products continue to be produced. This results in waste being generated, customer dissatisfaction, supply chain issues, etc.

In sharp contrast to the deficiencies described above, the techniques of various embodiments and approaches described herein include monitoring manual and/or semi-automated manual tasks, e.g., folding, packing, wrapping, etc., to provide error-free production. Furthermore, various of such techniques use a reference video of a predefined processes and compare it with the video from a live production process. An alert is output in the event that any process deviations are identified. More specifically, a reference video of a process is converted into a discrete and non-overlapping set of steps in a production process. Here, video is converted into images, and each image represents a unique step in the process considered. Object detection algorithms are trained to identify each step. Furthermore, a comparison of two sequences of steps from the production process is performed, e.g., one from a live video and one from a reference video. An algorithm for determining whether or not reference steps appear in the same order in the live video is executed.

Figure 3A:
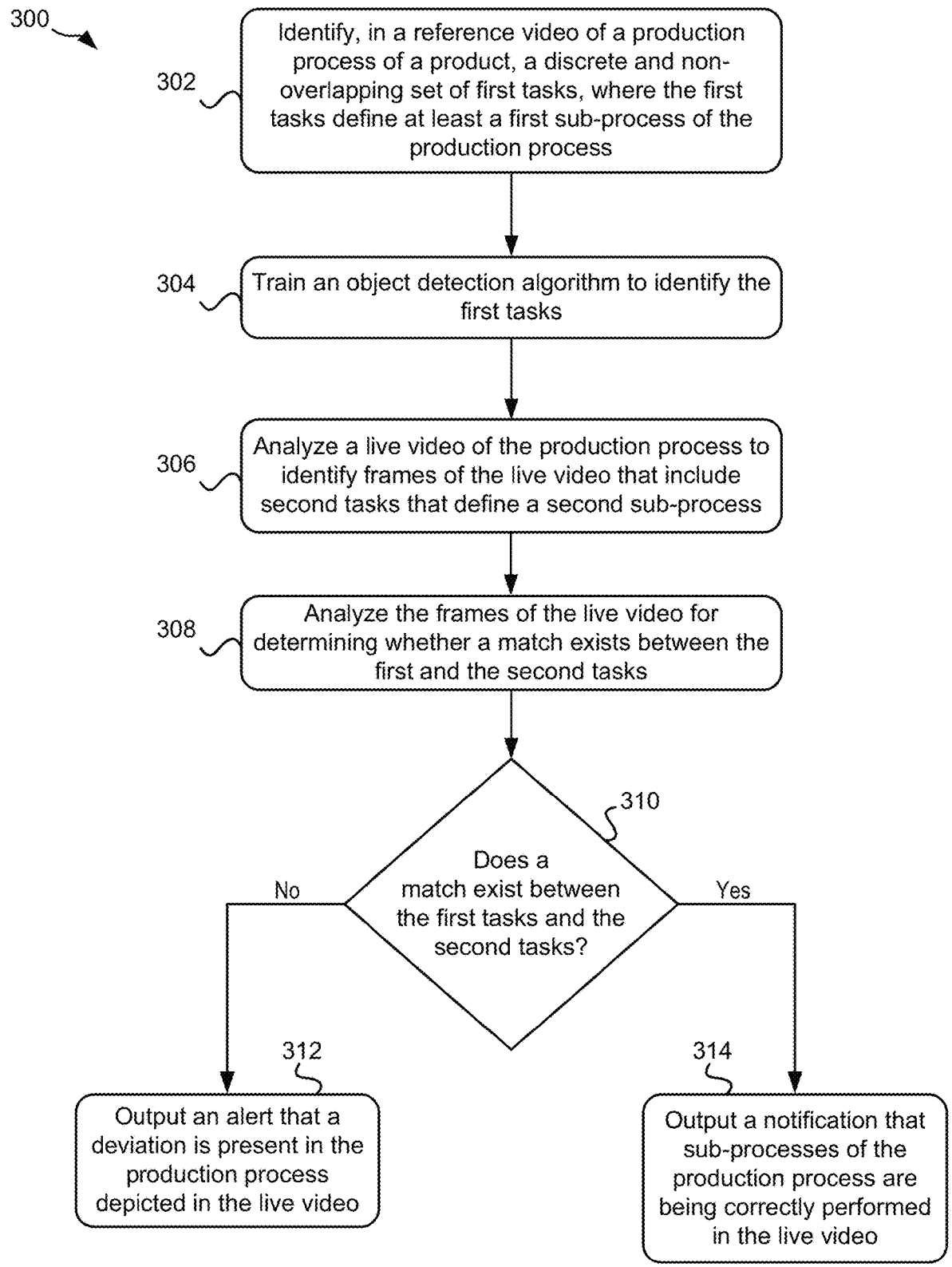
FIG. 3A is a flowchart of a method, in accordance with one embodiment of the present invention.

Now referring to FIG. 3A, a flowchart of a method 300 is shown according to one embodiment. The method 300 may be performed in accordance with the present invention in any of the environments depicted in FIGS. 1-7, among others, in various embodiments. Of course, more or fewer operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 includes techniques for enabling near real-time monitoring of a production environment to identify any errors in manual and/or semi-automated tasks and/or mechanical tasks performed by robots. An objective of these techniques includes performing inspection of a product during a production phase, rather than during a post-production verification phase. This reduces an amount of rework that would otherwise occur and/or scrap that is otherwise produced. Accordingly, a fix for the sub-process may be determined and implemented to avoid any additional work being performed using the defective or incorrect portion of the production process. This validation and ensuring that processes are followed according to predefined standards helps to maintain quality standards, reduce rework, reduce scrap, and furthermore enhance customer satisfaction and brand value.

Operation 302 includes identifying, in a reference video of a production process of a product, a discrete and non-overlapping set of first tasks. For context, the product may include any product that is capable of being produced by a production process, e.g., a circuit board, a computer, a children's toy, furniture, clothing, shoes, automotive parts and/or an automobile, etc. The production process may include a plurality of sub-processes of the production process, that all are all performed in order to produce the product. Furthermore, one or more tasks performed within a given sub-process may define the sub-process. For example, as will be described in further detail below, the production process may include, e.g., a first sub-process, a second sub-process, a third sub-process, a fourth sub-process, etc., and sets of tasks may each define a different sub-process, e.g., first tasks may define the first sub-process, second tasks may define the second sub-process, third tasks may define the third sub-process, fourth tasks may define the fourth sub-process, etc. Moreover, sets of tasks are preferably a same type of production action that the sub-process is based on. For example, in one approach, the first sub-process may include cutting the product, and the first tasks may include a series of different cutting actions that are to be performed on the product. In another example, in one approach, the first sub-process may include drilling the product, and the first tasks may include a series of different drilling actions that are to be performed on the product. In another example, in one approach, the first sub-process may include folding the product, and the first tasks may include a series of different folding actions that are to be performed on the product. In yet another example, in one approach, the first sub-process may include coloring the product, and the first tasks may include a series of different coloring actions that are to be performed on the product. Furthermore, in one approach, the first sub-process may include hammering the product, and the first tasks may include a series of different hammering actions that are to be performed on the product. It should be noted that in some approaches, a sub-process does not include casting the product as this may be a robotic process that is routinely performed with only a predetermined negligible amount of error potential existing, e.g., such as the unlikely event that a casting machine overpours a mold. In contrast, in some other approaches, the casting may be performed by a human and therefore may be subject to inspection using techniques of the method described herein.

In some approaches, the reference video of the production process is captured by a plurality of cameras. For example, each camera of a plurality of cameras may be positioned with a view of a location, e.g., a point along a manufacturing and/or fabrication assembly line of a plant, at which one of the sub-processes is performed on the product. In some other approaches, at least two or more of the sub-processes may be performed at the same location, and therefore a single camera may be used to capture the at least two or more of the sub-processes. In some approaches, one or more of the cameras may be mounted to a body of a worker that is participating in production of the product. One or more of the cameras may additionally and/or alternatively be mounted to a structure that has a view of the location(s) at which one or more of the sub-processes are being performed. Furthermore, it should be noted that in some approaches, the reference video preferably is analyzed from a complete video rather than merely a portion of the complete video.

Various approaches described below refer to use of predetermined algorithms. One or more of these predetermined algorithms may be executed by a device that is performing one or more operations of method 300 and/or to cause a device to perform one or more operations of method 300. Accordingly, such algorithms may include, e.g., a portion of code, at least some computer instructions, etc.

In some approaches, the discrete and non-overlapping set of first tasks may be identified using a predetermined algorithm, e.g., hereafter referred to as a "first predetermined algorithm," that is configured to derive a discrete and non-overlapping set of tasks. More specifically, this first predetermined algorithm may be configured to derive a set of individual tasks that need to be performed for the successful execution of the sub-process considered. Such tasks uniquely define the sub-process, e.g., the first tasks define the first sub-process. In one approach, the first predetermined algorithm may be used to cause, e.g., executed to instruct, the reference video of the production process, e.g., in which at least the first sub-process is executed, to be converted into frames. One or more techniques, that would become appreciated by one of ordinary skill in the art upon reading descriptions herein, may be used for causing the reference video to be converted into a plurality of images of image. Each frame is compared with a previous frame, e.g., a frame that immediately precedes the frame. Such a comparison may be based on one or more factors, e.g., average brightness, image hashes, etc., to compare the frames to determine whether differences exist in the frame. In some approaches, such differences are based on an entirety of the frames. In some alternate approaches, such differences are based only on a portion of the frame, e.g., such as a predetermined sub-portion of the frame that includes the product. In response to a determination that there are no differences in the frames of a comparison, e.g., the frames are redundant in that they depict redundant images therein, one of the frames is filtered out from the plurality of frames. In contrast, in response to a determination that there are differences in the frames of a comparison, the frames of the comparison are not filtered out from the plurality of frames. This comparison process is preferably performed iteratively until it is determined that no redundant frames exist in the plurality of frames. Accordingly, a discrete and non-overlapping set of first tasks that define the first sub-process are derived. In some optional approaches, a subject matter expert (SME) may be relied upon to ensure that the first tasks are clearly defined. For example, in one approach, the derived discrete and non-overlapping set of first tasks may be output to a device used by a predetermined SME with a request to confirm the first tasks. A confirmation and/or rejection of the first tasks may be received from the device used by the SME.

With the discrete and non-overlapping set of first tasks that define the first sub-process identified, it is known how to "properly" perform, e.g., a guide, a template, a goal, a preferred technique, etc., the production process of the product. Note that this assumes that the production process of the product only includes the first sub-process. For example, in some other approaches, tasks that define a plurality of sub-processes may be identified and thereby define how to "properly" perform the production process of the product, e.g., see FIG. 7. As will now be described below, the first tasks of the identified first sub-process may be used to ensure that a production process of a product depicted in a live video is being properly performed.

With reference again to FIG. 3A, in some approaches, operation 304 includes training an object detection algorithm, e.g., hereafter referred to as a "third predetermined algorithm," to learn and identify the first tasks, e.g., from frames of the reference video. By training the third predetermined algorithm to learn and identify the first tasks that define the first sub-process, a determination may be made as to whether or not a step, e.g., a task, a plurality of tasks, a sub-process, etc., performed in the live video matches one of the steps, e.g., a task, a plurality of tasks, a sub-process, etc., from the reference video. In other words, the third predetermined algorithm may be trained to determine a "correctness" of at least some tasks in a live video. The third predetermined algorithm may in some approaches be trained as each sub-process of the reference video is broken down into tasks, e.g., as a result of executing the first predetermined algorithm. The third predetermined algorithm may be configured to, when executed, attempt to learn each of such task using a predetermined object detection training process. For example, object edge detection techniques, that would become appreciated by one of ordinary skill in the art upon reading descriptions herein, may be used to characterize a relative intended shape of the product in each of the tasks. In some other approaches, the third predetermined algorithm is an object detection algorithm that is implemented in a neural network. During training in such approaches, tasks, e.g., the first tasks, the second tasks, etc., may be considered and used as objects, on which the deep neural network is trained to detect such tasks.

A live video of the production process is analyzed to identify frames of the live video that include second tasks that define a second sub-process, e.g., see operation 306. In some preferred approaches, the production process is analyzed in about real time, e.g., with potentially only a few seconds of processing delay included therein. In some other approaches, the production process is analyzed with a predetermined amount of delay intentionally incorporated therein to the live video feed, but preferably not to an extent that allows a next one of the sub-processes within the video feed to occur before a most previously performed sub-process within the video feed is analyzed.

Figure 3B:
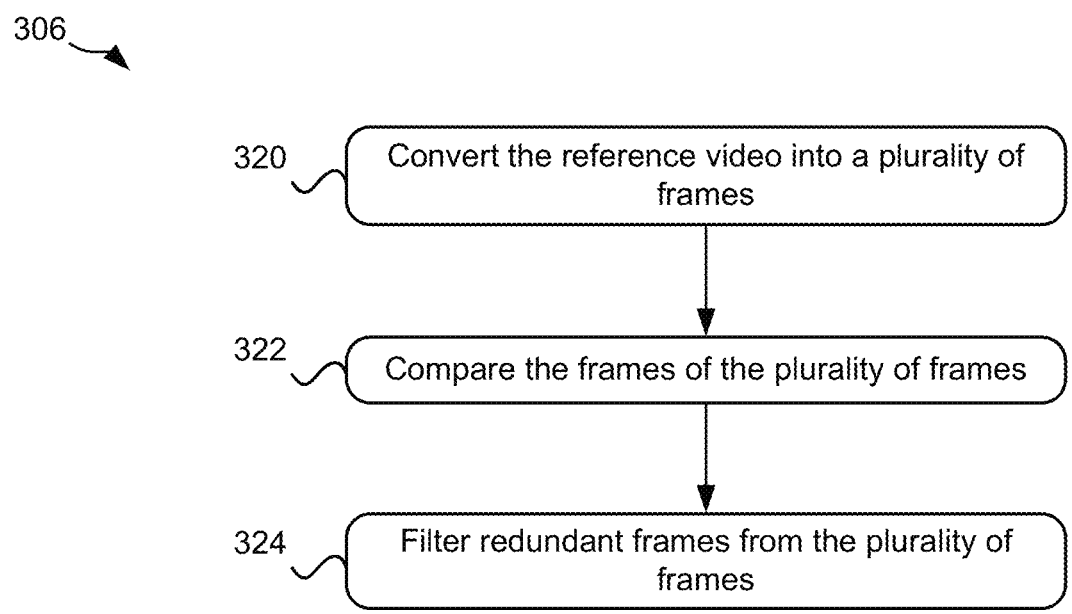
FIG. 3B is a flowchart of sub-operations of an operation of the flowchart of FIG. 3A, in accordance with one embodiment of the present invention.

Looking to FIG. 3B, exemplary sub-operations of analyzing the live video of the production process are illustrated in accordance with one embodiment, one or more of which may be used to perform operation 306 of FIG. 3A. However, it should be noted that the sub-operations of FIG. 3B are illustrated in accordance with one embodiment which is in no way intended to limit the invention.

With continued reference to FIG. 3B, sub-operation 320 includes converting the reference video into a plurality of frames. The frames of the plurality of frames are compared, e.g., see sub-operation 322, and redundant frames are filtered from the plurality of frames, e.g., see sub-operation 324. The non-redundant frames of the plurality of frames that are not filtered out may each depict a unique one of the second tasks. It should be noted that various of the techniques described elsewhere above with respect to analyzing the reference video of the production process may be modified to perform sub-operations 320-324 to derive second tasks that define the second sub-process. However, it should be noted that a predetermined algorithm used to perform one or more of the sub-operations 320-324, e.g., hereafter referred to as a "second predetermined algorithm," may be a variant of the first predetermined algorithm described elsewhere above for analyzing the reference video, in that no manual intervention is preferably performed while analyzing the live video. Instead, a goal of such analysis includes deriving the second tasks from the live video of the manufacturing process that depicts at least the second sub-process. Note that this analysis may be iteratively and/or parallelly performed to determine and verify the tasks that define a plurality of sub-processes, e.g., as will be described in greater detail elsewhere herein in FIG. 7.

Operation 308 includes analyzing the frames of the live video for determining whether a match exists between the first tasks and the second tasks. In some approaches, comparison techniques that would become appreciated by one of ordinary skill in the art upon reading the descriptions herein may be used to analyze the frames of the live video that include each of the first tasks of the first sub-process with at least one of the second frames of the second sub-process for determining whether a match exists. In some approaches, this analysis may include performing a plurality of comparisons. For example, each of the plurality of comparisons may compare a different sub-portion of the product in a frame of the live video with an associated sub-portion of the product in the reference video. This may allow the determination of whether a match exists to be accurately based on a plurality of different analysis operations. In another approach, an alternate approach to using the third predetermined algorithm includes using a different predetermined algorithm, e.g., hereafter referred to as a "fourth predetermined algorithm." In this approach, each task of the first sub-process is considered as an object, and the step is detected for in the live video frames during a comparison of the frames of the reference video with the frames of the live video. This approach may additionally and/or alternatively include building a neural network that identifies whether two frames of each comparison are similar or not, e.g., a frame of the reference video and a frame of the live video. Such a neural network may be built by using a known type of iterative analysis and feedback approach in which comparison techniques used within the neural network are trained using training data until at least a predetermined accuracy threshold is achieved.

In some other approaches, comparing the first tasks and the second tasks to determine whether a match exists between the first tasks and the second tasks may additionally and/or alternatively include generating one or more similarity scores. In another example, the comparing may include generating similarity scores for the product in a frame of the reference video of the production process and the product in one or more frames of the live video of the production process. Known techniques for scoring a similarity of two identifiable objects may be used. In another example, the comparing may include generating similarity scores for actions, e.g., folding motion, drilling placement, hammer placement, etc., performed by an actor, e.g., a machine, a human, etc., on the product in frames of the reference video of the production process and a same type of actions, e.g., folding motion, drilling placement, hammer placement, etc., performed by an actor, e.g., a machine, a human, etc., on the product in frames of the live video of the production process. Known techniques for scoring a similarity of two actions may be used. As will be described elsewhere below, these scores may be compared with a predetermined threshold, e.g., see decision 310. Note that in some approaches difference score(s) may additionally and/or alternatively be determined and compared with a second predetermined threshold.

In decision 310, it is determined, based on the comparison, whether a match exists between the first tasks and the second tasks. For context, it should be noted that in some preferred approaches, the comparison of the first frames to the second frames may specifically only compare a property of the product, e.g., product shape, which is being produced rather than otherwise including an environment around the product in the comparison. This is because the location, assembly line, plant, etc., at which the product is produced in the live video does not impact the state of the product in each task performed. For example, a product that is produced in a production process on a first assembly line may be determined to match a product that is produced in a production process on a second assembly line, despite the first and second assembly lines looking different. In some other approaches, the determination of whether a match exists may additionally and/or alternatively be based on the tasks within the frames matching. For example, in some approaches, the determination of whether a match exists may be based on an order that the second tasks are detected to occur in, e.g., such as where it is determined that a match exists in response to a determination that the order that the second tasks are detected to occur match an order that the first tasks are detected to occur in. In yet another approach, the determination of whether a match exists may additionally and/or alternatively be based on product color, e.g., a color of the product in the reference video matching with a color of the product in the live video for an associated one of the tasks. The match between the first tasks and the second tasks may additionally and/or alternatively be defined by each of the first tasks matching with a different one of the second tasks, e.g., each of the non-redundant frames obtained from the reference video match with a different one of the non-redundant frames obtained from the live video.

The determination of decision 310 may in some approaches additionally and/or alternatively be based on a comparison of one or more determined similarity scores and/or one or more determined difference score(s) with one or more predetermined thresholds. For example, in response to a determination that a similarity score of one of the tasks of the reference video and one of the tasks of the live video is greater than or equal to a predetermined threshold, it may be determined that a match exists between the tasks. Moreover, in response to a determination that at least a predetermined number of the frames match, it may be determined that a sub-process of the live video defined by the frames used in the comparison and determination matches with the sub-process of the reference video. Furthermore, in response to a determination that at least a predetermined number of the sub-processes match, it may be determined that a match exists. In contrast, in response to a determination that a similarity score of one of the tasks of the reference video and one of the tasks of the live video is not greater than or equal to a predetermined threshold, it may be determined that a match does not exist between the tasks. Moreover, in response to a determination that at least a predetermined number of the frames do not match, it may be determined that a sub-process of the live video defined by the frames used in the comparison and determination does not match with the sub-process of the reference video. Furthermore, in response to a determination that at least a predetermined number of the sub-processes do not match, it may be determined that a match does not exist.

In response to a determination that the match exists, e.g., as illustrated by the "Yes" logical path of decision 310, a notification that sub-processes of the production process are being correctly performed and/or have been correctly performed in the live video may be output, e.g., see operation 314. The notification may, in some approaches, be output to a device used by, e.g., a manager of the production process depicted in the live video, a worker participating in the production process depicted in the live video, a quality control manager, etc. In some approaches, the notification may be output to a controller that is configured to display a light of a predetermined color, e.g., green, such as along the production assembly line. In response to a determination that the match does not exist, e.g., as illustrated by the "No" logical path of decision 310, an alert that a deviation is present in the production process depicted in the live video may be output, e.g., see operation 312. The notification may, in some approaches, be output to a device used by, e.g., a manager of the production process depicted in the live video, a worker participating in the production process depicted in the live video, a quality control manager, etc. In some approaches the notification may be output to a controller that is configured to display a light of a predetermined color, e.g., red, and/or an audio alarm, such as along the production assembly line. For context, the "deviation" may in some approaches identify an error, e.g., an incorrect cut, an incorrect shape of the product, an incorrectly placed weld on the product, etc., that is present in the production process depicted in the live video. In some optional approaches in which the deviation is determined to actually be an error, the error may be recognized and a pre-determined fix that is determined to be associated with the error may be output, e.g., with the notification, in a separate notification subsequent to the error being confirmed by manual inspection, etc. In contrast, in some other approaches, the deviation may actually be an anomaly that is not necessarily an error per se, but warrants investigation by someone alerted by the notification, e.g., a longer than average fold being performed on the product, a weld leaving an abnormal weld pattern on the product, a view of the camera being at least temporarily obstructed, etc.

In one use case, a predetermined algorithm, e.g., hereafter referred to as a "fifth predetermined algorithm" may serve as a decision-making algorithm to infer complete correctness of one or more of the sub-processes depicted in the live video of the production process. For example, it may be assumed that a sub-process "S" identified in the reference video includes five tasks, e.g., T1, T2, T3, T4, and T5. Furthermore, it may be assumed that frames I1, I2, I3, I4, I5, I6, I7 and I8 (which may also be referred to as "frames") are the frames from a live video of a production process. These frames may be obtained by executing the second predetermined algorithm described elsewhere above. Furthermore, a first sub-process (S1) may be defined by the tasks, e.g., let S1={T1, T1, T2, T2, T3, T4, T5, T5} to be the corresponding tasks identified for these frames upon executing the third predetermined algorithm and/or the fourth predetermined algorithm described elsewhere above.

A goal of performing the fifth predetermined algorithm may be to achieve at least two determinations. A first of these determinations is whether all the steps, e.g., tasks, from the sub-process are present in S1. A second of these determinations is whether the tasks T1, T2, T3, T4, T5 from the sub-sub-process appear in a same order in S1. In response to a determination that these two criteria are met, it may be concluded that the sub-process is being executed as per the tasks from the reference video. Alerts are preferably generated for any deviations.

As noted elsewhere above, the production process may, in some approaches, include a plurality of sub-processes to produce the product. Accordingly, in some approaches, the first tasks identified in the reference video of the production process may define more than one sub-process. For example, in one approach, the first tasks may define the first sub-process and a third sub-process of the production process, e.g., wherein a first portion of the first tasks define the first sub-process and a second portion of the first tasks define the third sub-process. In such an approach, method 300 may include training an object detection algorithm to identify, e.g., learn, the first tasks and the second tasks, and analyzing, e.g., in about real time, the live video of the production process to identify second frames of the live video that include fourth tasks that define a fourth sub-process. The trained object detection algorithm may be caused, e.g., instructed, to determine whether a match exists between the first tasks that define the third sub-process and the fourth tasks. In some approaches, the trained object detection algorithm is caused, e.g., instructed, to compare the third tasks with the fourth tasks to determine whether a match exists between the third tasks and the fourth tasks, and in response to a determination that a match does not exist between the third tasks and the fourth tasks, an alert that a deviation is present in the production process depicted in the live video may be output. In contrast, in response to a determination that a match exists between the third tasks and the fourth tasks, a notification that sub-processes of the production process are being correctly performed and/or have been correctly performed in the live video may be output.

Numerous benefits are enabled as a result of utilizing the techniques of various embodiments and approaches described herein. For example, as a result of utilizing these techniques, tasks and/or sub-processes performed with deviation and potentially error are identified in a production process in about real time. This way, waste, that would otherwise be produced if the deviation was identified relatively later in an inspection process of the finished product, is prevented. This also adds an inspection process into the production process itself, which ultimately further ensures that defects of a product (resulting from deviations in the production process) do not reach a customer, which would otherwise cause customer dissatisfaction, expensive and time consuming return and/or exchange processes, etc. This elimination of deviations within the production process furthermore reinforces an overall product quality and safety, as defective products are able to be eliminated from the consumer market. Furthermore, it should be noted that identification and alert to deviations in a video of a live production process has heretofore not been considered in conventional production techniques. In sharp contrast, conventional production processes rely on inspection processes that occur after a product is done being produced. Accordingly, the inventive discoveries disclosed herein with regards to use of identification and alert to deviations in a video of a live production process proceed contrary to conventional wisdom.

Figure 4:
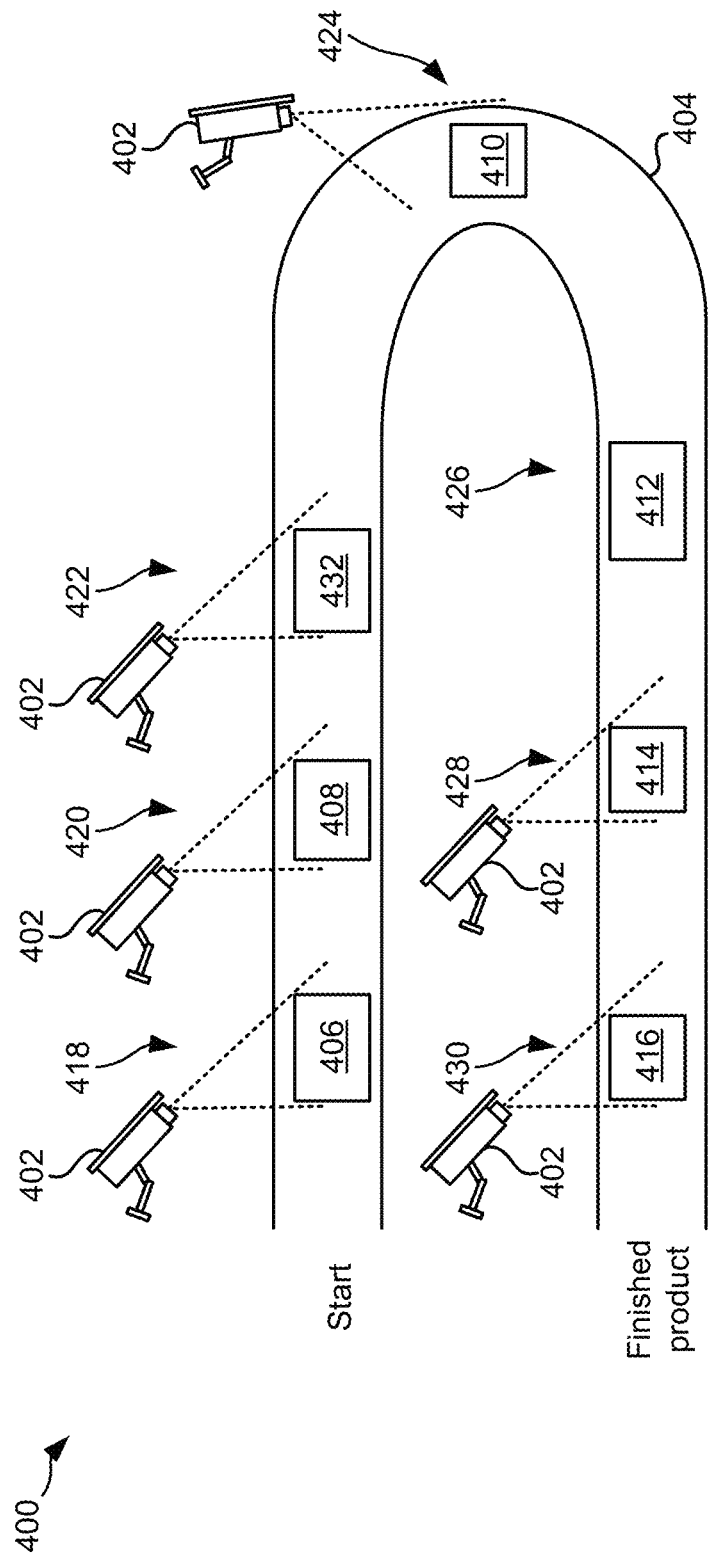
FIG. 4 depicts a production process environment, in accordance with one embodiment of the present invention.

FIG. 4 depicts a production process environment 400, in accordance with one embodiment. As an option, the present production process environment 400 may be implemented in conjunction with features from any other embodiment listed herein, such as those described with reference to the other FIGS. Of course, however, such production process environment 400 and others presented herein may be used in various applications and/or in permutations which may or may not be specifically described in the illustrative embodiments listed herein. Further, the production process environment 400 presented herein may be used in any desired environment.

The production process environment 400 includes a production line 404, on which a plurality of sub-processes is performed. Furthermore, the sub-processes may be defined by one or more manual tasks, semi-automated tasks, robotic mechanical tasks, etc., that are capable of being monitored. Any number of sub-processes may be performed from a start to a finished product section of the production line, e.g., see a first sub-process 406 that includes cutting tasks 418, a second sub-process 408 that includes drilling tasks 420, a third sub-process 432 that includes folding tasks 422, a fourth sub-process 410 that includes coloring tasks 424, a fifth sub-process 412 that includes casting tasks 426, a sixth sub-process 414 that includes welding tasks 428, and an $n^{th}$ sub-process 416 that includes packaging tasks 430, to produce a predetermined product.

Several of the sub-processes are monitored separately and captured in a live video by a plurality of cameras 402. It may be noted that the fifth sub-process 412 that includes the casting tasks 426 is not monitored by a camera. This is because in some approaches, a sub-process that includes casting the product may be excluded from monitoring as this may be a robotic process that is routinely performed with only a predetermined negligible amount of deviation potential existing therein.

A reference video of a production process that occurs on the production line may be captured, and one or more operations described elsewhere herein may be performed in order to identify, in the reference video of the production process of the product, a discrete and non-overlapping set of first tasks. The first tasks define at least a first sub-process. Furthermore, a live video of the production process may be analyzed, e.g., in about real time, to identify frames of the live video that include second tasks that define a second sub-process. The first tasks may be compared with the second tasks to determine whether a match exists between the first tasks and the second tasks. In response to a determination that the match does not exist, e.g., between at least the tasks of the first sub-process and the tasks of the second sub-process, an alert is output that a deviation is present in the production process depicted in the live video.

Figure 5:
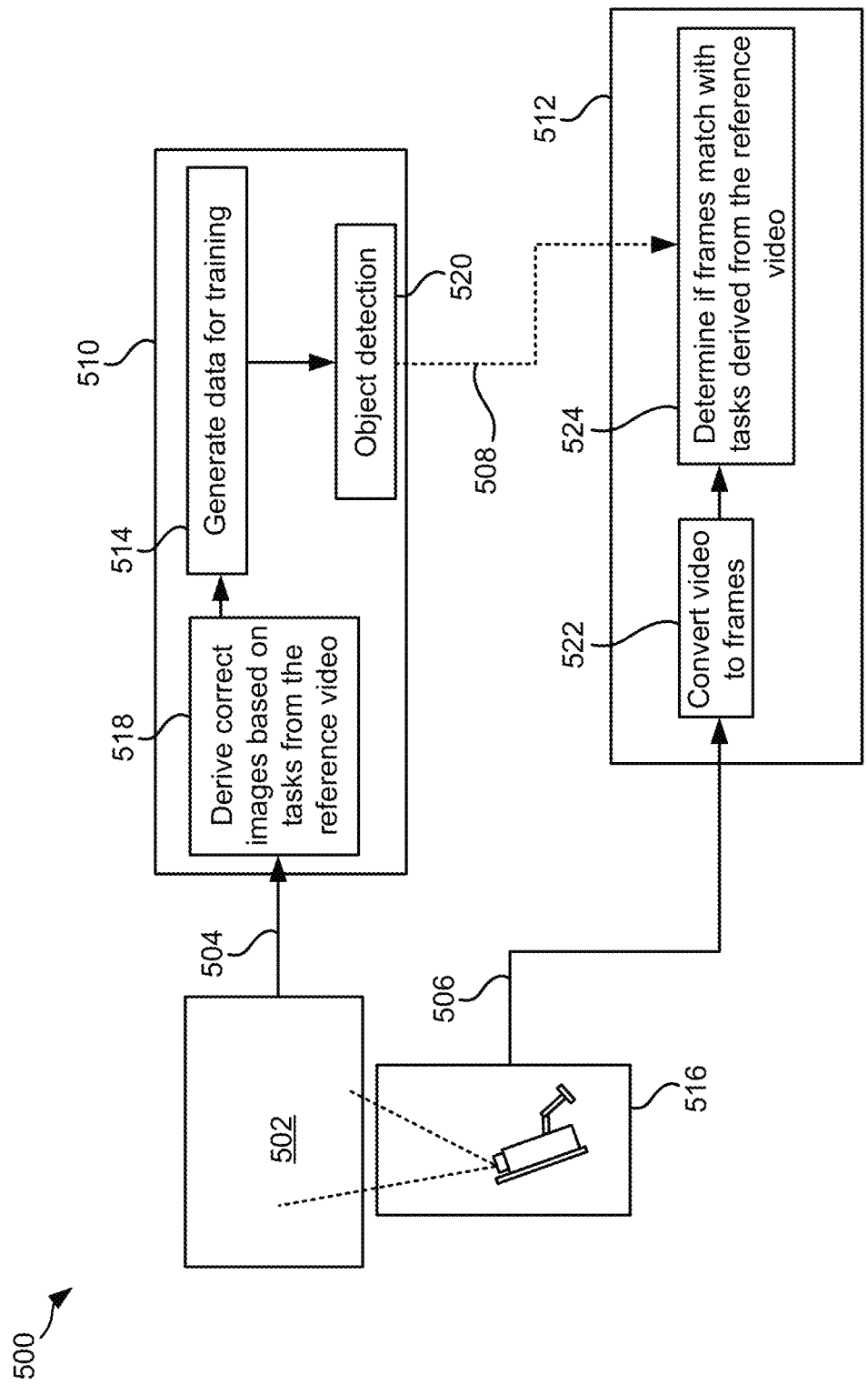
FIG. 5 is a flowchart of a method, in accordance with one embodiment of the present invention.

Now referring to FIG. 5, a flowchart of a method 500 is shown according to one embodiment. The method 500 may be performed in accordance with the present invention in any of the environments depicted in FIGS. 1-7, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

The flowchart of method 500 includes a logical diagram of monitoring a sub-process, e.g., folding 502 a predetermined product, using at least one known type of video camera 516. In operation 504, a reference video that includes tasks of the folding sub-process is input into a training process 510. Correct images based on tasks are derived from the reference video, e.g., see operation 518. More specifically, a discrete and non-overlapping set of first tasks are identified in the reference video, where the first tasks define at least a folding sub-process. Frames of the reference video that include these tasks are used as training data, e.g., see operation 514, to train a predetermined object detection algorithm, e.g., see operation 520.

A live video of the production process is used as input in near real time, e.g., see operation 506, in a process 512 to determine whether deviation is present in a production process in the live video. The process 512 includes converting the live video to frames, e.g., see operation 522. Decision 524 includes determining whether the frames match with the tasks derived from the reference video, e.g., see operation 508 input data in the decision 524. In response to a determination that the match does not exist, an alert that a deviation is present in the production process depicted in the live video is output.

Figure 6:
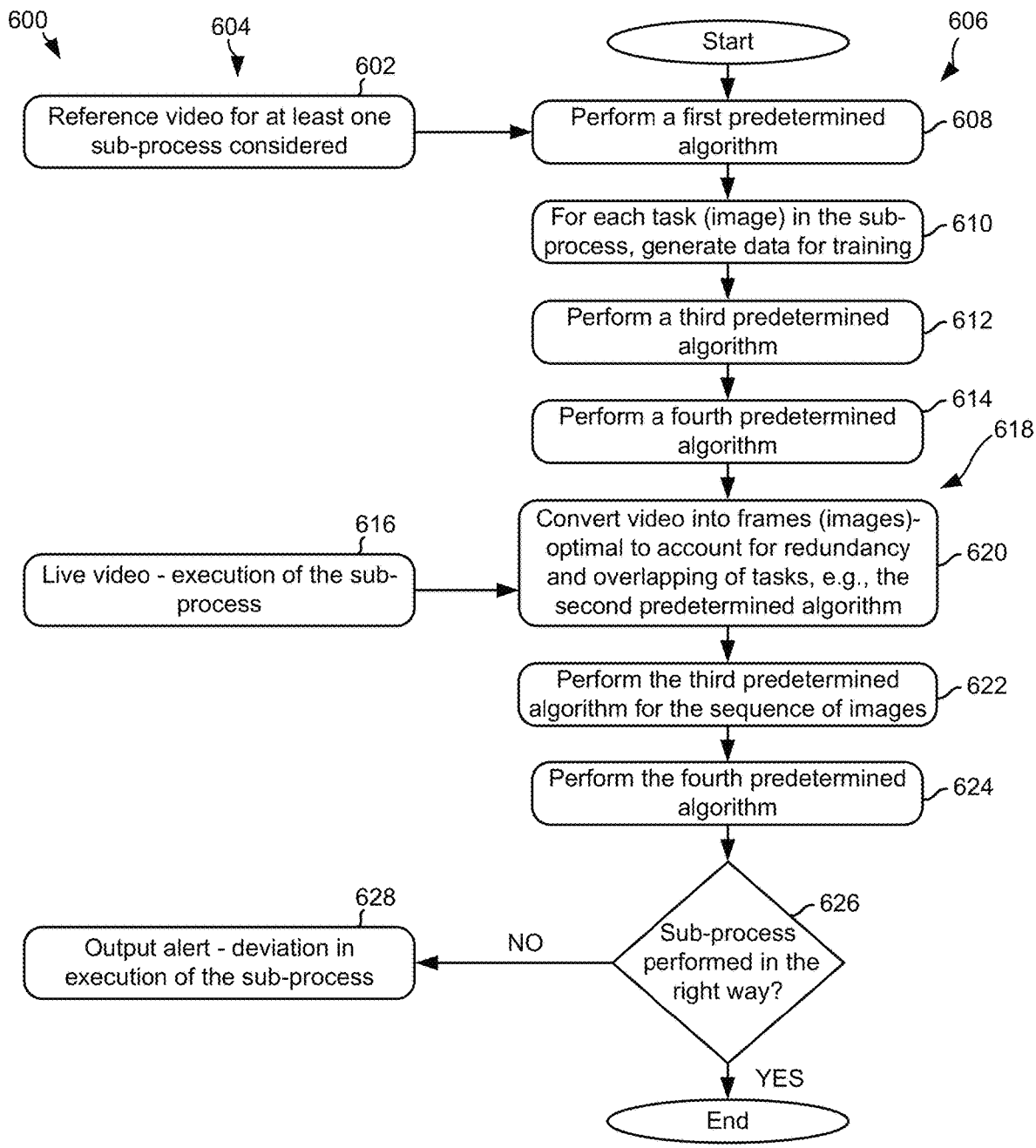
FIG. 6 is a flowchart of a method, in accordance with one embodiment of the present invention.

Now referring to FIG. 6, a flowchart of a method 600 is shown according to one embodiment. The method 600 may be performed in accordance with the present invention in any of the environments depicted in FIGS. 1-7, among others, in various embodiments. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

The flowchart of method 600 illustrates an overall proposed approach for training and scoring a sub-process.

The method 600 may start, e.g., see Start, at any time, e.g., such as in response to receiving input/output (I/O) data 604 such as a reference video, e.g., see operation 602. In a training portion 606 of the flowchart of method 600, a first predetermined algorithm, e.g., the first predetermined algorithm described elsewhere above in method 300, may be performed to derive a discrete and non-overlapping set of tasks, e.g., see operation 608. For each task (image) in the sub-process, data may be generated for training an object detection algorithm, e.g., see operation 610. Operation 612 includes performing a third predetermined algorithm, e.g., the third predetermined algorithm described elsewhere above in method 300, for training the object detection algorithm to learn the tasks from each of the frames. Operation 614 includes performing a decision making algorithm, e.g., the fourth predetermined algorithm described elsewhere above in method 300, to infer complete correctness of the sub-process.

A live video that depicts an execution of the sub-process is input, e.g., see operation 616, into a production environment portion 618 of the flowchart of method 600. In operation 620, the live video is converted into frames (images), and filtering is performed to obtain optimal frames, e.g., without redundancy, to account for redundancy and overlapping of tasks. In some approaches, the second predetermined algorithm described elsewhere above in method 300 may be used in operation 620. Operation 622 includes performing a third predetermined algorithm for the derived sequence of frames, e.g., the third predetermined algorithm described elsewhere above in method 300. Operation 624 includes performing a fourth predetermined algorithm, e.g., the fourth predetermined algorithm described elsewhere above in method 300. It is determined whether the sub-process is performed in the right way, e.g., decision 626. More specifically, it is determined whether a match exists between tasks derived from the reference video and tasks derived from the live video. In response to a determination that a match does not exist, e.g., as illustrated by the "NO" logical path of decision 626, method 600 includes outputting an alert that a deviation is present in execution of the sub-process in the live video, e.g., see operation 628. In contrast, in response to a determination that a match does exist, e.g., as illustrated by the "YES" logical path of decision 626, method 600 optionally ends, e.g., see End.

Figure 7:
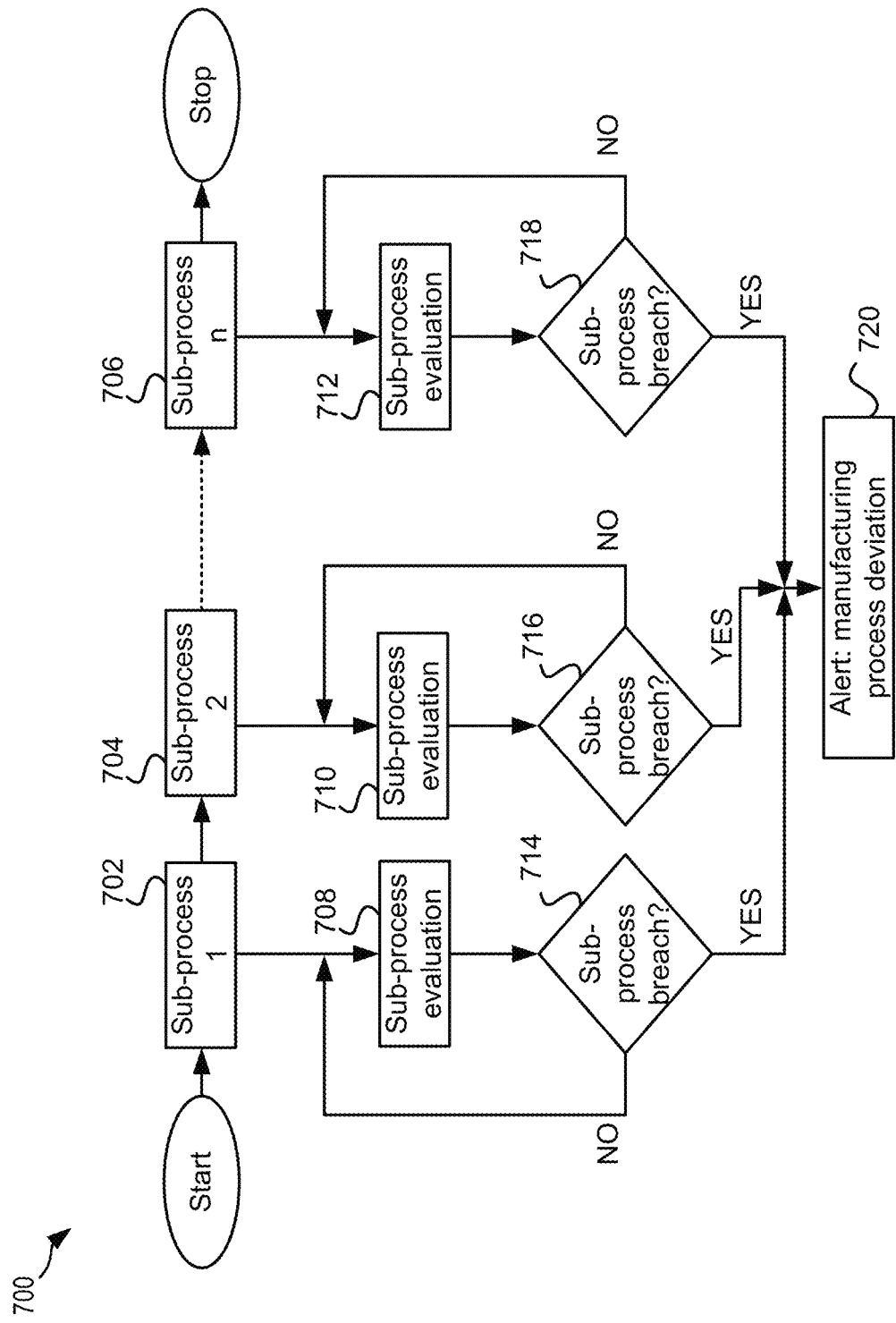
FIG. 7 is a flowchart of a method, in accordance with one embodiment of the present invention.

As the manufacturing process is broken down into various sub-processes, overall manufacturing process monitoring through individual sub-process monitoring may be performed, e.g., see FIG. 7.

Now referring to FIG. 7, a flowchart of a method 700 is shown according to one embodiment. The method 700 may be performed in accordance with the present invention in any of the environments depicted in FIGS. 1-7, among others, in various embodiments. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

The flowchart of FIG. 7 illustrates that the analysis of techniques described herein, e.g., method 300, may be performed in parallel to determine and verify the tasks that define a plurality of sub-processes, e.g., see sub-process 1, sub-process 2 and sub-process n of operations 702-706 which define the sub-processes. In a sub-process evaluation phase of method 700, e.g., see operations 708-718, each of the sub-processes of the plurality of sub-processes are considered to determine whether a breach has occurred. More specifically, comparisons are performed to determine whether a match exists between tasks derived from a reference video of a production process and tasks derived from a live video of a production process. In response to a determination that the match does not exist, e.g., see YES, an alert that a deviation is present in the production process depicted in the live video may be output, e.g., see operation 720. In contrast, in response to a determination that a mismatch is not present in one or more of the considered sub-processes, the method 700 optionally ends, e.g., see Stop, or in an alternate approach, monitoring for such a mismatch may continue, e.g., see NO.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying, in a reference video of a production process of a product, a discrete and non-overlapping set of first tasks, wherein the first tasks define at least a first sub-process;
   analyzing a live video of the production process to identify frames of the live video that include second tasks that define a second sub-process;
   analyzing the frames of the live video for determining whether a match exists between the first tasks and the second tasks, wherein analyzing the live video of the production process to identify the frames of the live video that include the second tasks includes: converting the reference video into a plurality of frames of the production process of the product, comparing the frames to find overlapping tasks in the first tasks of the reference video, and filtering redundant frames having the overlapping tasks comprising at least one of cutting the product, folding the product, or coloring the product in the first tasks from the plurality of frames of the reference video, wherein non-redundant frames remaining of the plurality of frames each depict one of the second tasks; and
   in response to a determination that the match does not exist, outputting an alert that a deviation is present in the production process depicted in the live video, the alert being a first notification, wherein the first notification is at least one of output to a user device, output to a controller configured to display a light of a predetermined color on an assembly line, or output to the controller configured to sound an audio alarm on the assembly line.

2. The computer-implemented method of claim 1, wherein:
   a predetermined fix to the deviation is output in a separate notification from the alert;
   a given sub-process on the product is performed by a robot; and
   the analyzing of the live video of the production process excludes the given sub-process performed by the robot because the given sub-process is routinely performed with an acceptable amount of the deviation.

3. The computer-implemented method of claim 1, wherein the first tasks define a third sub-process of the production process, and comprising: training an object detection algorithm to identify the first tasks and the second tasks; analyzing the live video of the production process to identify second frames of the live video that include fourth tasks that define a fourth sub-process; and causing the trained object detection algorithm to determine whether a match exists between the first tasks that define the third sub-process and the fourth tasks.

4. The computer-implemented method of claim 3, wherein the object detection algorithm is implemented in a neural network, wherein the first and second tasks are used as objects for the training of the neural network.

5. The computer-implemented method of claim 1, wherein the match between the first tasks and the second tasks is defined by each of the first tasks matching with a different one of the second tasks.

6. The computer-implemented method of claim 1, wherein the match is based on a group of properties consisting of: product shape, an order that the second tasks are detected to occur in, and product color.

7. A computer program product, the computer program product comprising a non-transitory computer readable storage medium having program instructions embodied therewith, the program instructions executable by a computer to cause the computer to:

identify, by the computer, in a reference video of a production process of a product, a discrete and non-overlapping set of first tasks, wherein the first tasks define at least a first sub-process;

analyze, by the computer, a live video of the production process to identify frames of the live video that include second tasks that define a second sub-process;

analyze, by the computer, the frames of the live video for determining whether a match exists between the first tasks and the second tasks, wherein analyzing the live video of the production process to identify the frames of the live video that include the second tasks includes: converting the reference video into a plurality of frames of the production process of the product, comparing the frames to find overlapping tasks in the first tasks of the reference video, and filtering redundant frames having the overlapping tasks comprising at least one of cutting the product, folding the product, or coloring the product in the first tasks from the plurality of frames of the reference video, wherein non-redundant frames remaining of the plurality of frames each depict one of the second tasks; and in response to a determination that the match does not exist, output, by the computer, an alert that a deviation is present in the production process depicted in the live video, the alert being a first notification, wherein the first notification is at least one of output to a user device, output to a controller configured to display a light of a predetermined color on an assembly line, or output to the controller configured to sound an audio alarm on the assembly line.

8. The computer program product of claim 7, wherein:
a predetermined fix to the deviation is output in a separate notification from the alert;
a given sub-process on the product is performed by a robot; and
the analyzing of the live video of the production process excludes the given sub-process performed by the robot because the given sub-process is routinely performed with an acceptable amount of the deviation.

9. The computer program product of claim 7, wherein the first tasks define a third sub-process of the production process, and the program instructions executable by the computer to cause the computer to: train, by the computer, an object detection algorithm to identify the first tasks and the second tasks; analyze, by the computer, the live video of the production process to identify second frames of the live video that include fourth tasks that define a fourth sub-process; and cause, by the computer, the trained object detection algorithm to determine whether a match exists between the first tasks that define the third sub-process and the fourth tasks.

10. The computer program product of claim 9, wherein the object detection algorithm is implemented in a neural network, wherein the first and second tasks are used as objects for the training of the neural network.

11. The computer program product of claim 7, wherein the match between the first tasks and the second tasks is defined by each of the first tasks matching with a different one of the second tasks.

12. The computer program product of claim 7, wherein the first sub-process comprises drilling the product.

13. A system, comprising:
a hardware processor; and
logic integrated with the processor, executable by the processor, or integrated with and executable by the processor, the logic being configured to:

identify, in a reference video of a production process of a product, a discrete and non-overlapping set of first tasks, wherein the first tasks define at least a first sub-process;

analyze a live video of the production process to identify frames of the live video that include second tasks that define a second sub-process;

analyze the frames of the live video for determining whether a match exists between the first tasks and the second tasks, wherein analyzing the live video of the production process to identify the frames of the live video that include the second tasks includes: converting the reference video into a plurality of frames of the production process of the product, comparing the frames to find overlapping tasks in the first tasks of the reference video, and filtering redundant frames having the overlapping tasks comprising at least one of cutting the product, folding the product, or coloring the product in the first tasks from the plurality of frames of the reference video, wherein non-redundant frames remaining of the plurality of frames each depict one of the second tasks; and in response to a determination that the match does not exist, output an alert that a deviation is present in the production process depicted in the live video, the alert being a first notification, wherein the first notification is at least one of output to a user device, output to a controller configured to display a light of a predetermined color on an assembly line, or output to the controller configured to sound an audio alarm on the assembly line.

14. The system of claim 13, wherein:
a predetermined fix to the deviation is output in a separate notification from the alert;
a given sub-process on the product is performed by a robot; and
the analyzing of the live video of the production process excludes the given sub-process performed by the robot because the given sub-process is routinely performed with an acceptable amount of the deviation.

15. The system of claim 13, wherein the first tasks define a third sub-process of the production process, and the logic being configured to: train an object detection algorithm to identify the first tasks and the second tasks; analyze the live video of the production process to identify second frames of the live video that include fourth tasks that define a fourth sub-process; and cause the trained object detection algorithm to determine whether a match exists between the first tasks that define the third sub-process and the fourth tasks.

16. The system of claim 13, wherein the match between the first tasks and the second tasks is defined by each of the first tasks matching with a different one of the second tasks.

17. The system of claim 13, wherein the match is based on a group of properties consisting of: product shape, an order that the second tasks are detected to occur in, and product color.

18. The system of claim 13, wherein the first sub-process comprises drilling the product.

* * * * *